(12) United States Patent
Gomez et al.

(10) Patent No.: US 10,427,617 B2
(45) Date of Patent: Oct. 1, 2019

(54) ADJUSTABLE INTERFACE MOUNT FOR A WORK VEHICLE

(71) Applicant: CNH Industrial America LLC, New Holland, PA (US)

(72) Inventors: Lorenzo Gomez, Westmont, IL (US); Eran Salzman, Glenview, IL (US); Bryan Lee Nannet, Aurora, IL (US); Eric Holton, Burr Ridge, IL (US); Jermaine Andre Ealy, Aurora, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/383,890

(22) Filed: Dec. 19, 2016

(65) Prior Publication Data

US 2018/0170274 A1 Jun. 21, 2018

(51) Int. Cl.
*B60R 11/02* (2006.01)
*B60N 2/75* (2018.01)
(Continued)

(52) U.S. Cl.
CPC ............... *B60R 11/02* (2013.01); *B60N 2/79* (2018.02); *B60R 2011/0014* (2013.01);
(Continued)

(58) Field of Classification Search
CPC . B60R 11/02; B60R 11/0229; B60R 11/0252; B60R 11/0235;
(Continued)

(56) References Cited

U.S. PATENT DOCUMENTS

| 278,028 | A | * | 5/1883 | Lobdell | E04F 15/02 403/339 |
| 3,003,600 | A | * | 10/1961 | MacKenzie | A47B 96/1408 403/4 |

(Continued)

FOREIGN PATENT DOCUMENTS

FR 2907065 A 4/2008

*Primary Examiner* — Ingrid M Weinhold
(74) *Attorney, Agent, or Firm* — Rickard K. DeMille; Rebecca L. Henkel (57) ABSTRACT

In one embodiment, an interface mount for a work vehicle includes a first mounting arm and a second mounting arm. The first mounting arm includes a mounting portion disposed at a first end of the first mounting arm and configured to mount to a base bracket, and a first mating portion disposed at a second end of the first mounting arm, wherein the first mounting arm includes a bend disposed between the first end and the second end. The second mounting arm includes a second mating portion disposed at a first end of the second mounting arm, wherein the first mating portion and the second mating portion have substantially similar contours, and the first mating portion is configured to be coupled to the second mating portion via an adjustable slotted interface, and an interface mounting portion disposed at a second end of the second mounting arm and configured to receive an interface unit. The adjustable slotted interface is configured to selectively enable the first mounting arm and the second mounting arm to slide relative to one another between an expanded position and a contracted position.

10 Claims, 6 Drawing Sheets

(51) Int. Cl.
  *B60R 11/00* (2006.01)
  *F16M 11/28* (2006.01)

(52) U.S. Cl.
  CPC .......... *B60R 2011/0084* (2013.01); *B60R 2011/0089* (2013.01); *F16M 11/28* (2013.01)

(58) Field of Classification Search
  CPC ..... B60R 2011/0029; B60R 2011/0014; B60R 2011/0084; B60R 2011/0085; B60R 2011/0089; A47B 2096/1491; A47B 96/1408; A47B 96/1458; A47B 2200/0022; A47B 21/02; E04C 2003/0413; E04C 2003/0417; F16M 11/28; F16B 7/10; F16B 7/182; F16B 7/187; E04F 2011/187
  USPC ............ 248/160, 161, 157, 162.1, 404–405, 248/406.1–406.2, 407–414, 423, 188.5; 403/109.6, 109.1, 363, 3, 80; 108/44, 108/150, 50.1; 52/633, 126.6, 846, 640, 52/644; D25/132; 116/63 R; 182/183.1, 182/62.5
  See application file for complete search history.

(56) References Cited

U.S. PATENT DOCUMENTS

| | | | | |
|---|---|---|---|---|
| 3,025,933 | A * | 3/1962 | Comino | A47B 96/1408 403/3 |
| 3,250,051 | A * | 5/1966 | Cheris | A47B 96/1408 403/3 |
| 3,592,144 | A * | 7/1971 | Futrell | A47B 31/06 108/44 |
| 3,738,690 | A * | 6/1973 | White | A47B 96/1408 403/4 |
| 3,870,271 | A * | 3/1975 | Bowman | A47C 3/24 108/142 |
| 4,493,469 | A * | 1/1985 | Holobaugh | A47C 3/245 108/147 |
| 4,500,134 | A * | 2/1985 | Kaneko | A61G 15/14 108/137 |
| 4,842,174 | A * | 6/1989 | Sheppard | B60R 11/02 108/45 |
| 4,982,923 | A * | 1/1991 | Wanner | B23Q 9/005 248/157 |
| 5,125,194 | A * | 6/1992 | Granger | E01F 9/685 403/2 |
| D332,789 | S * | 1/1993 | Rak | D12/415 |
| 5,177,616 | A * | 1/1993 | Riday | B64D 11/0015 248/917 |
| 5,188,479 | A * | 2/1993 | Nehls | E04B 1/2403 403/300 |
| 5,207,405 | A * | 5/1993 | Cobb | A47B 81/061 108/49 |
| 5,485,793 | A * | 1/1996 | Crowell | A47B 23/04 108/44 |
| D367,477 | S * | 2/1996 | Rosen | D14/452 |
| 5,524,858 | A * | 6/1996 | Friend | A47G 29/1216 232/39 |
| 5,615,620 | A * | 4/1997 | Owen | A47B 23/04 108/150 |
| 5,673,628 | A * | 10/1997 | Boos | B60N 3/001 108/138 |
| 5,709,360 | A * | 1/1998 | Rosen | B64D 11/0015 248/278.1 |
| 5,751,548 | A | 5/1998 | Hall et al. | |
| 5,765,911 | A * | 6/1998 | Sorenson | A47C 7/70 248/284.1 |
| 5,957,425 | A * | 9/1999 | Conway | G09F 7/20 248/548 |
| 6,039,141 | A | 3/2000 | Denny | |
| 6,158,793 | A * | 12/2000 | Castro | B60R 11/02 224/548 |
| 6,315,252 | B1 * | 11/2001 | Schultz | B60R 11/0252 108/44 |
| 6,381,133 | B1 | 4/2002 | Chen | |
| 6,382,745 | B1 * | 5/2002 | Adkins | B60N 3/002 108/97 |
| 6,386,413 | B1 * | 5/2002 | Twyford | B60R 11/0252 108/138 |
| 6,412,426 | B1 * | 7/2002 | Holloway, Jr. | B60R 11/02 108/44 |
| 6,746,065 | B1 | 6/2004 | Chan | |
| 7,121,514 | B2 * | 10/2006 | Twyford | B60R 11/0235 248/177.1 |
| 7,422,016 | B2 * | 9/2008 | Klemm | A61B 90/60 128/845 |
| 7,852,622 | B2 * | 12/2010 | Ferren | B60K 35/00 248/917 |
| 7,857,311 | B2 * | 12/2010 | Minke | A63F 13/02 273/148 R |
| 8,025,016 | B2 * | 9/2011 | Adams | A47B 23/043 108/150 |
| 8,197,341 | B2 * | 6/2012 | Gray | A63F 13/02 463/36 |
| 8,272,604 | B2 * | 9/2012 | Foster | B60R 11/0252 248/124.1 |
| 8,393,590 | B2 * | 3/2013 | Kato | B60N 2/0702 248/394 |
| 8,459,191 | B2 * | 6/2013 | Adams | A47B 23/043 108/150 |
| 8,668,257 | B2 * | 3/2014 | Wu | A47C 7/70 248/446 |
| D732,045 | S * | 6/2015 | Stener | D14/447 |
| D758,284 | S | 6/2016 | Ringer et al. | |
| 2004/0011015 | A1 | 1/2004 | Nanlawala | |
| 2004/0016588 | A1 * | 1/2004 | Vitale | B60K 37/00 180/322 |
| 2004/0035989 | A1 | 2/2004 | Sweere et al. | |
| 2004/0164210 | A1 * | 8/2004 | Le | B60R 11/0235 248/200 |
| 2006/0011788 | A1 | 1/2006 | Jang | |
| 2006/0242671 | A1 | 10/2006 | Vitito | |
| 2007/0040084 | A1 | 2/2007 | Sturman et al. | |
| 2007/0102600 | A1 | 5/2007 | Ishizaki et al. | |
| 2008/0036925 | A1 | 2/2008 | Hsaio | |
| 2009/0001241 | A1 | 1/2009 | Tang et al. | |
| 2009/0230261 | A1 | 9/2009 | Su | |
| 2010/0181452 | A1 | 7/2010 | Steege | |
| 2011/0233365 | A1 * | 9/2011 | Kato | B60N 2/0702 248/429 |
| 2012/0018475 | A1 | 1/2012 | Cooper | |
| 2012/0153117 | A1 | 6/2012 | Bowman et al. | |
| 2013/0233984 | A1 | 9/2013 | Huang | |
| 2014/0203156 | A1 * | 7/2014 | Stener | F16M 11/14 248/425 |
| 2014/0246468 | A1 | 9/2014 | Montgomery et al. | |
| 2015/0163935 | A1 | 6/2015 | Kasuga | |
| 2015/0217702 | A1 | 8/2015 | Jacobsthal et al. | |
| 2016/0091135 | A1 | 3/2016 | Chen | |

\* cited by examiner

ADJUSTABLE INTERFACE MOUNT FOR A WORK VEHICLE

BACKGROUND

The disclosure generally relates to interface mounts, and more specifically to interface mounts for use in a cab of a work vehicle.

An operator may sit in a cab of the work vehicle to control the work vehicle during the performance of an operation (e.g., an agricultural operation, an earth-moving operation, etc.). The operator may control operation of the work vehicle using a steering wheel, pedals, a hand controller, or other suitable interfaces for receiving input from the operator. Further, the work vehicle may include an interface (e.g., a computer monitor) to interface information about the work vehicle and/or an implement coupled to or towed by the work vehicle to the operator. Particularly short or tall operators may have difficulty seeing a fixed interface positioned for an average sized operator.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In one embodiment, an interface mount for a work vehicle includes a first mounting arm and a second mounting arm. The first mounting arm includes a mounting portion disposed at a first end of the first mounting arm and configured to mount to a base bracket, and a first mating portion disposed at a second end of the first mounting arm, wherein the first mounting arm includes a bend disposed between the first end and the second end. The second mounting arm includes a second mating portion disposed at a first end of the second mounting arm, wherein the first mating portion and the second mating portion have substantially similar contours, and the first mating portion is configured to be coupled to the second mating portion via an adjustable slotted interface, and an interface mounting portion disposed at a second end of the second mounting arm and configured to receive an interface unit. The adjustable slotted interface is configured to selectively enable the first mounting arm and the second mounting arm to slide relative to one another between an expanded position and a contracted position.

In a second embodiment, an interface mount for a work vehicle includes a first mounting arm and a second mounting arm. The first mounting arm includes a lower body member extending from a first end of the first mounting arm to a second end of the first mounting arm, a mounting portion having an aperture and an arcuate slot, each configured to receive a respective pin, wherein the first mounting arm includes a bend disposed between the first end and the second end of the first mounting arm, wherein the mounting portion is disposed at the first end of the first mounting arm and configured to mount to a base bracket via the respective pins, forming a pivoting pinned interface, and a first mating flange disposed at the second end of the first mounting arm and extending substantially orthogonally outward from the lower body member. The second mounting arm includes an upper body portion extending from a first end of the second mounting arm to a second end of the second mounting arm, a second mating flange disposed at the first end of the second mounting arm and extending substantially orthogonally outward from the upper body portion, wherein the first mating flange and the second mating flange have substantially similar contours, and the first mating flange is configured to be coupled to the second mating flange via an adjustable slotted interface, and an interface mounting portion disposed at the second end of the second mounting arm and configured to receive an interface unit. The adjustable slotted interface is configured to enable the first mounting arm and the second mounting arm to slide relative to one another between an expanded position and a contracted position.

In a third embodiment, an interface mount for a work vehicle includes a first mounting arm and a second mounting arm. The first mounting arm includes a mounting portion disposed at a first end of the first mounting arm and having an aperture and an arcuate slot, each configured to receive a respective pin, wherein the mounting portion is configured to mount to a base bracket via the respective pins, forming a pivoting pinned interface, and a first mating portion disposed at a second end of the first mounting arm, wherein the first mounting arm has a substantially U-shaped cross section at the second end of the first mounting arm, wherein the first mounting arm has a bend disposed between the first end and the second end. The second mating arm includes a second mating portion disposed at a first end of the second mounting arm, wherein the first mating portion and the second mating portion have substantially similar contours, the first mating portion is configured to be coupled to the second mating portion via an adjustable slotted interface, and wherein the first mating portion is configured to receive the second mating portion, an interface mounting portion disposed at a second end of the second mounting arm and configured to receive an interface unit, wherein the adjustable slotted interface is configured to selectively enable the first mounting arm and the second mounting arm to slide relative to one another between an expanded position and a contracted position, and a shoulder configured to block movement of the second mounting arm toward the lower mounting arm with respect to the first mounting arm in a contraction direction at the contracted position

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Work vehicles (e.g., tractors) may be controlled by an operator sitting in a cab of the work vehicle in the performance of an operation (e.g., an agricultural operation, an earth-moving operation, etc.). By incorporating adjustability into certain components within the cab, the vehicle may accommodate operators of a wide range of sizes.

Figure 1:
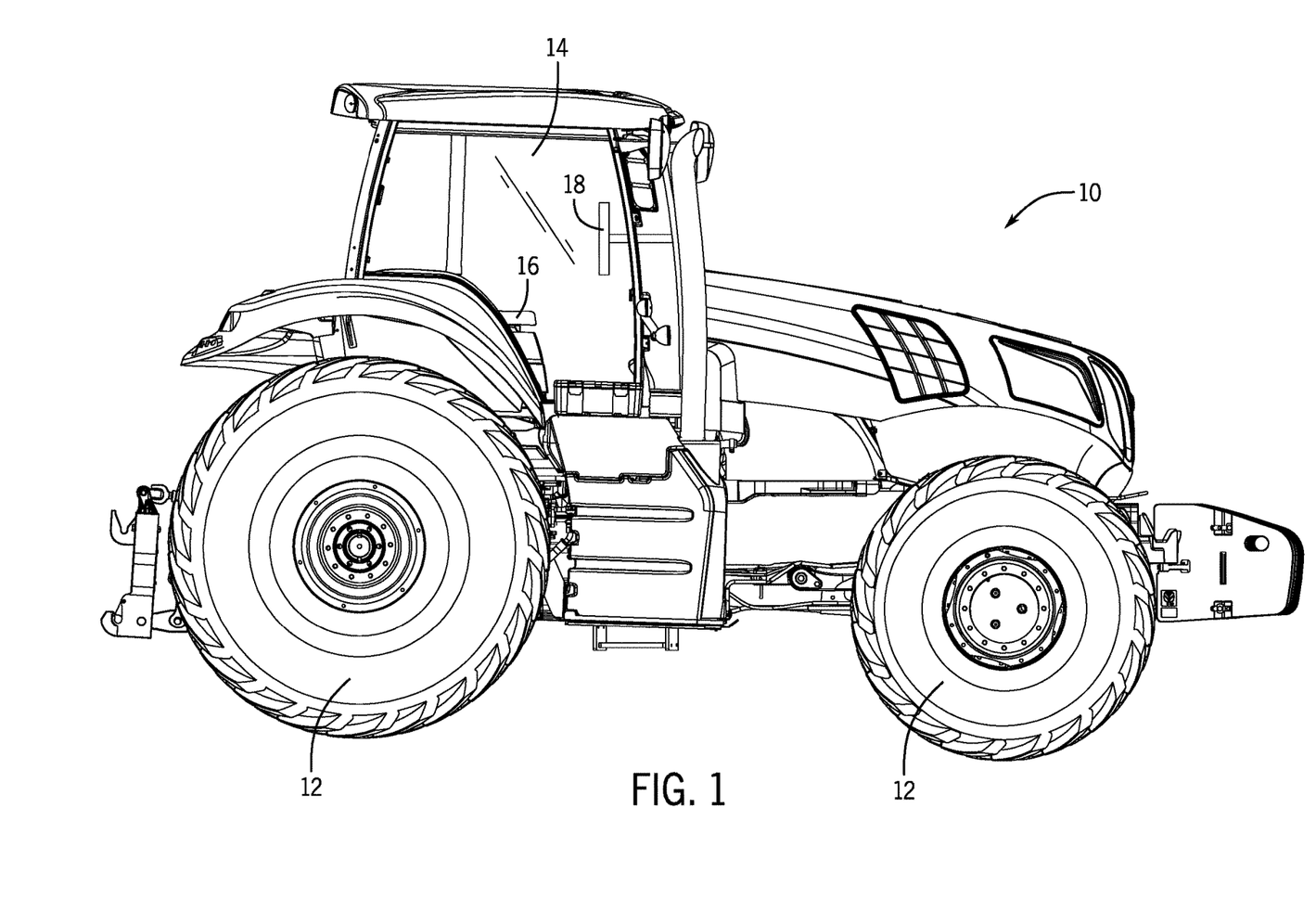
FIG. 1 is a side view of an embodiment of a work vehicle.

FIG. 1 is a perspective view of an embodiment of a work vehicle 10 (e.g., a tractor). The vehicle 10 may provide power to wheels 12 to propel the vehicle 10 down a road or through a field. In some embodiments, the vehicle 10 may be configured to tow an agricultural implement in the performance of an operation (e.g., tilling, planting, spraying, harvesting, earth moving, etc.). However, in some embodiments, the vehicle 10 may use tracks in place of the wheels 12.

The vehicle includes a cab 14 in which an operator sits while controlling operation of the vehicle 10. In the vehicle 10 shown in FIG. 1, the cab 14 is a closed cab, however, in other embodiments, the cab 14 may be an open air cab. The cab 14 includes a seat 16, on which the operator sits and an interface 18 (e.g., a computer monitor), which may interface information about the vehicle 10 and/or an implement coupled to a towed by the work vehicle to the operator before operation, during operation, after an operation, or a combination thereof. In some embodiments, the operator may use the interface 18 as an operator interface to configure various aspects of the vehicle 10 and/or the implement. In some embodiments, the interface 18 may include a keypad, a track pad, or buttons, or the interface 18 may be a touch-screen display. Fixed seat and interface positions configured for the average sized operator may make operation of the vehicle 10 uncomfortable or more difficult for large or small operators. Accordingly, incorporating a degree of adjustability into the components within the cab 14 may facilitate accommodation of a wider range of operators.

Figure 2:
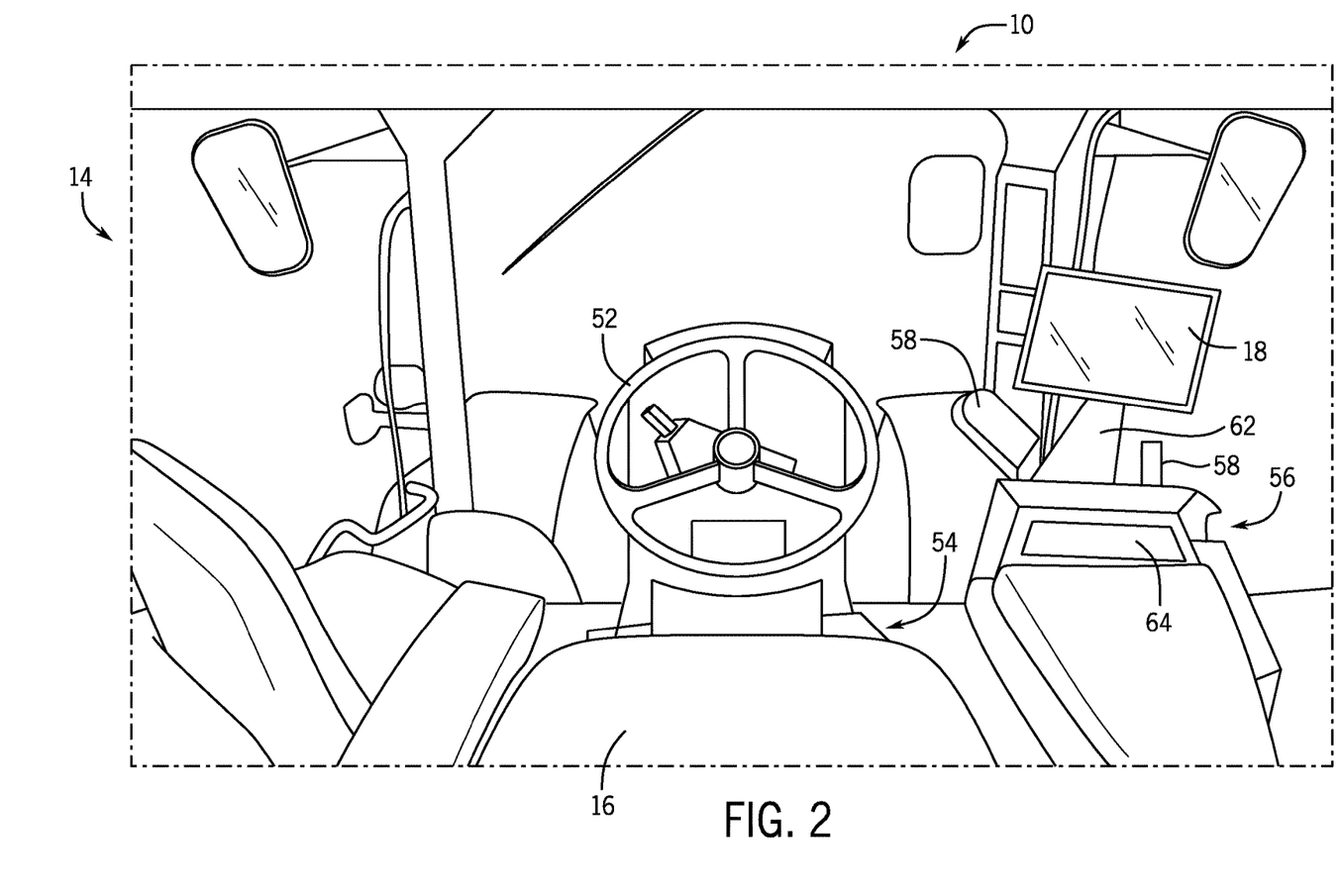
FIG. 2 is a perspective view of an embodiment of an interior of a cab of the work vehicle of FIG. 1.

FIG. 2 is a perspective view of an embodiment of an interior of the cab 14 of the work vehicle 10 of FIG. 1 (e.g., from the operator's point of view). As illustrated, the cab 14 includes the seat 16, on which the operator sits when operating the vehicle 10. In the illustrated embodiment, a steering wheel 52 is located near the seat 16, so as to be within arm's reach of the operator when the operator is seated on the seat 16. Though a steering wheel 52 is included in the illustrated embodiment, other embodiments of the vehicle 10 may include other devices for receiving steering inputs from the operator. For example, in place of a steering wheel, the cab 14 may have left/right control bars, a hand controller, pedals, or another suitable device for receiving steering inputs. Also located near the seat 16, at the operator's feet are one or more pedals 54. The pedals 54 may be configured to receive input from the operator for controlling the speed of the vehicle 10. For example, the pedals may control a throttle, brakes, a clutch, other suitable systems, or a combination thereof. In other embodiments, pedals may be used for steering inputs. Further, in embodiments in which the vehicle 10 is semi-autonomous or fully autonomous, the steering wheel and/or the pedals may be omitted.

Along one or both sides of the seat 16 may be an armrest 56. The armrest 56 may include one or more hand controllers 58, the interface 18, supported by an interface mount 62, and one or more buttons 64. The interface 18 may be used to present data to the operator, such as vehicle information (e.g., ground speed, oil pressure, engine temperature, etc.), implement operations information (e.g., rotor speed and grain loss), and manufacturer proprietary systems information (e.g. Advanced Farming Systems (AFS) information, including yield maps, position data, etc.). As will be described in more detail below, the interface mount 62 may be adjustable such that the operator may control the position of the interface 18 up/down and/or fore/aft. The interface between the interface 18 and the interface mount 62 may also enable the operator to tilt the interface 18. The hand controllers 58 and buttons 64 may enable the operator to control the vehicle 10 by inputting commands or instructions, which may be represented on the interface 18. For example, one hand controller 58 may control a cursor on the interface 18 such that movement of the hand controller 58 corresponds to movement of the cursor. In other embodiments, the interface 18 may be a touchscreen. By navigating menus on the interface 18, the operator may control various aspects of the vehicle 10 and/or an implement coupled to or towed by the vehicle 10.

The vehicle 10 may be used by operators of many different sizes. Fixed components (e.g., seat 16, interface 18, steering wheel 52, pedals 54, armrest 56, etc.) within the cab 14 may make operation of the vehicle 10 uncomfortable or difficult for particularly small or large operators. For example, a fixed interface 18 positioned for an average sized operator may not be conveniently located for particularly short or tall operators. Accordingly, adding adjustment to the interface mount 62 that enables the operator to adjust the position of the interface 18 may enable the work vehicle to accommodate a wider range of operator sizes. In some embodiments, the interface mount 62 may also enable the operator to temporarily move the interface to see something outside of the vehicle 10 cab 14 behind the interface 18.

Figure 3:
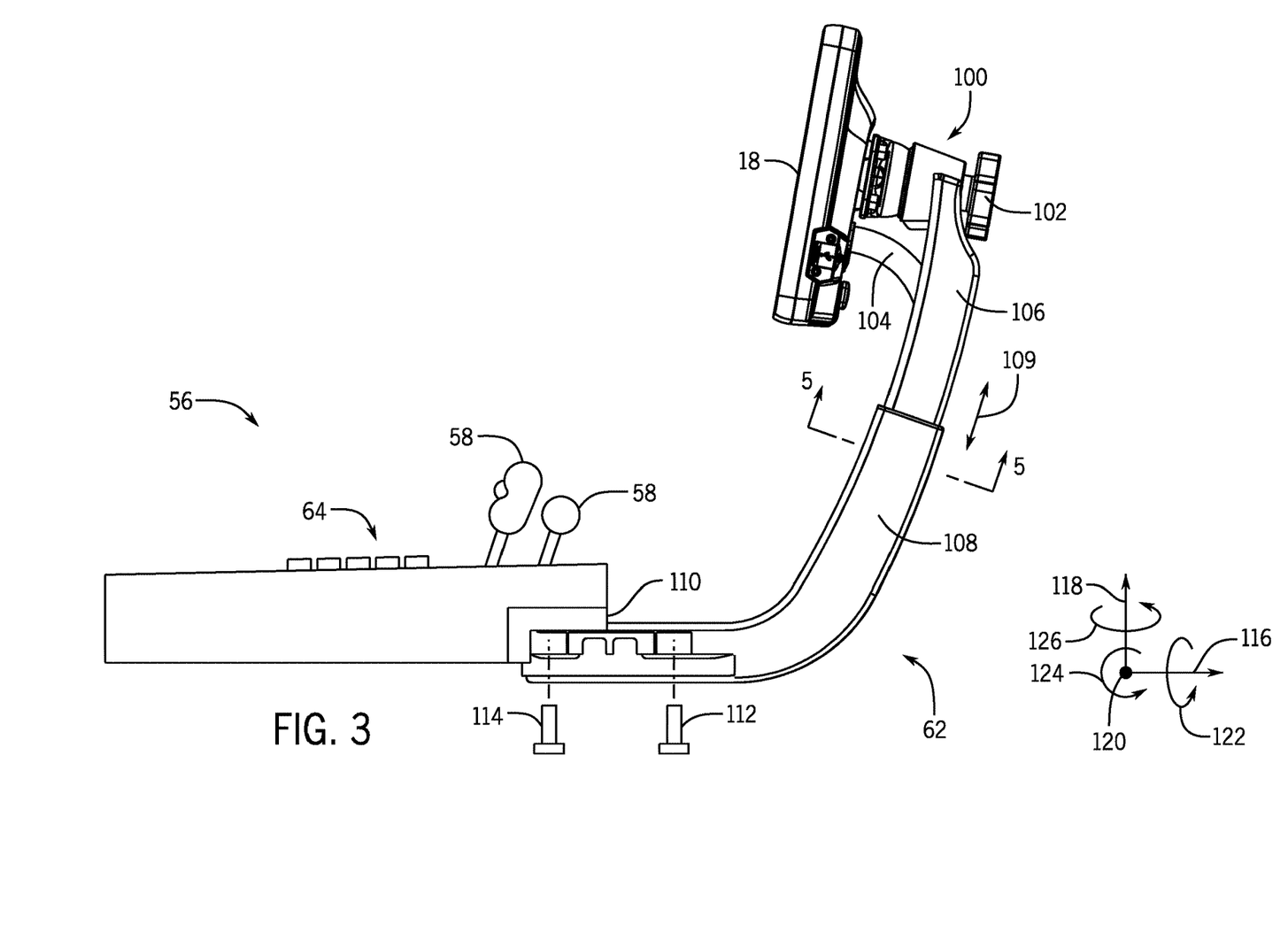
FIG. 3 is a side view of an embodiment of an interface display mount coupled to an armrest within the cab of FIG. 2.

FIG. 3 is a side view of an embodiment an interface mount 62 coupled to the armrest 56 within the cab 14 of FIG. 2. As illustrated, the interface 18 is coupled to the interface mount 62 via a ball mount 100. The operator may loosen the ball mount 100 via a knob 102, adjust the roll 122, pitch 124, and/or yaw 126 of the interface 18, and then lock the ball mount 100 by tightening the knob 102. In some embodiments, the ball mount 100 may be coupled to a bracket supporting multiple interfaces 18. As will be described in more detail below, one or more cables 104 may be routed through an interior volume (e.g., a cable harness cavity) of the interface mount 62.

The interface mount 62 includes a top cover 106 and a bottom cover 108. The top cover 106 and bottom cover 108 may be formed from plastic, metal, or another suitable material and may be configured to telescope within one another as the interface mount 62 extends and contracts (indicated by arrow 109). Accordingly, the top cover 106 and the bottom cover 108 may have substantially similar contours, enabling the covers 106, 108 to telescope.

The interface mount 62 couples to the armrest 56 via a base bracket 110. A pivot pin 112 extends through an aperture in the interface mount 62 and engages the base bracket 110 (e.g., via a threaded connection). The pivot pin enables the interface mount 62 to rotate about the pivot pin 112 to the left and right of the operator (e.g., yaw direction 126). A limit pin 114 extends through an arcuate slot in the interface mount 62 and engages the base bracket 110 (e.g., via threaded connection). Based on the dimensions of the arcuate slot, the limit pin 114 limits the rotational range of motion (e.g., in direction 126) of the interface mount 62. For example, the limit pin 114 may limit the range of motion of the interface mount 62 to 10°, 20°, 30°, 40°, 50°, 60°, 70°, 80°, 90°, 100°, 110°, 120°, or another suitable angle.

Figure 4:
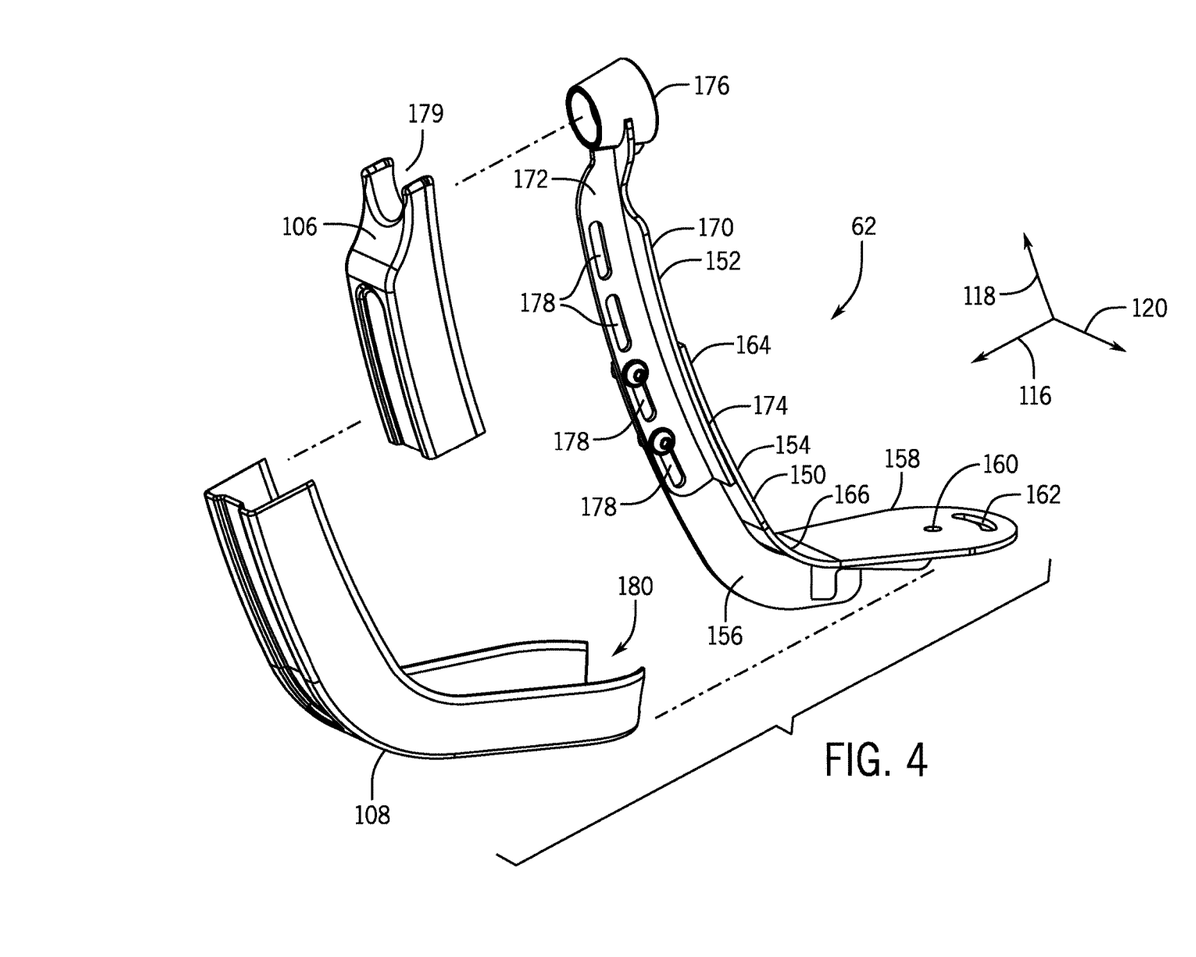
FIG. 4 is a perspective, partially exploded view of the interface mount of FIG. 3.

FIG. 4 is a perspective, partially exploded, view of the interface mount 62 of FIG. 3. The interface mount 62 includes a lower mounting arm 150 and an upper mounting arm 152, which couple to one another. The lower mounting arm 150 and the upper mounting arm 152 slide relative to one another, enabling the operator to adjust the position of the interface in a direction 118.

In the embodiment illustrated in FIG. 4, a portion of the lower mounting arm 150 has a substantially T-shaped cross section defined by a lower body member 154 and a first mating flange 156 that extends substantially orthogonally from the lower body member 154. The lower body member 154 includes a first mounting portion 158 configured to couple to the base bracket. The lower body member 154 has an aperture 160 and an arcuate slot 162, each configured to receive a respective pin. As previously discussed, the pivot pin extending through the aperture 160 enables the interface mount to rotate, and the limit pin extending through the arcuate slot 162 limits the range of rotation of the interface mount 62. In the illustrated embodiment, the arcuate slot 162 enables the interface mount 62 to rotate approximately 60 degrees. However, the arcuate slot may enable rotation of the mount through other ranges of rotation.

At an end of the lower body member 154 opposite the first mounting portion 158 is a first mating portion 164, at which the lower body member 154 couples to the upper mounting arm 152. The lower body member 154 has a bend 166. As illustrated, the first mating flange 156 follows the curvature of the bend 166. At the first mating portion 164, the first mating flange 156 includes two apertures (not shown) for receiving two fasteners, which are configured to couple the lower mounting arm 150 to the upper mounting arm 152. In other embodiments, the first mating flange 156 may include more than two apertures.

In some embodiments, a portion of the upper mounting arm 152 may have a generally T-shaped cross section. A slot (not shown) extends through an upper body member 170 adjacent to a second mating flange 172 partially along the length of the upper mounting arm 152 (e.g., in directions 116 and 118). However, in other embodiments, the upper mounting arm 152 has a generally L-shaped cross section, such that the upper mounting arm 152 fits between the lower mounting arm 150 and the first mating flange 156. The cross section of the upper mounting arm 152 is defined by the upper body member 170 and the second mating flange 172, which extends substantially orthogonal outward from the upper body member 170, following the contour of the upper body member 170. The upper body member 170 includes a second mating portion 174 at one end and an interface mounting portion 176 at an opposite end. The second mating portion 174 has a contour that substantially matches the contour of the first mating portion 158, such that the upper mounting arm 152 can slide up and down the lower mounting arm 150, while maintaining contact with the lower mounting arm. In the illustrated embodiment, the interface mounting portion 176 is configured to receive a ball mount. However, it should be understood that other techniques for interfacing with an interface or an interface bracket (e.g., a bracket configured to support multiple interfaces) may be utilized in alternative embodiments.

The second mating flange 172 includes slots 178 that align with the apertures of the first mating flange 156 to receive the fasteners. The slots enable lower mounting arm 150 and the upper mounting arm 152 to slide relative to one another while the fasteners are loosened, thereby expanding or contracting the interface mount 62 to a length. The fasteners may then be tightened to lock the interface mount 62 in the desired configuration. As shown, the second mating flange 172 includes more slots than apertures on the first mating flange 156. For example, the operator may remove the fasteners and move the upper mounting arm 152 such that a different set of slots 178 aligns with the apertures, and then reinstall the fasteners to extend the range of motion.

The top and bottom covers 106 and 108 couple to the upper and lower mounting arms 152, 150, respectively. The top and bottom covers 106 and 108 have substantially U-shaped cross-sections, such that when the covers 106, 108 couple to the respective mounting arms 152, 150, volumes are established (e.g., wire harness cavity) on either side of the flanges 156, 172 for receiving a cable harness. As previously discussed, the covers 106, 108 are shaped with substantially matching contours, thereby enabling the covers 106, 108 to telescope as the upper mounting arm 152 is moved relative to the lower mounting arm 150.

The top cover 106 includes a recess 179 proximate the interface mounting portion 176 and configured to conform to the interface mounting portion 176 of the upper mounting arm 152. In addition, the bottom cover 108 includes a wire harness exit 180 at an end proximate the first mounting portion 158 through which the cable harness can be routed below the armrest. As discussed above, the first mating portion 164 of the lower mounting arm 150 and the second mating portion 174 of the upper mounting arm 152 may have substantially similar contours such that the lower mounting arm 150 and the upper mounting arm 152 may slide relative to one another along the direction 118.

Figure 5:
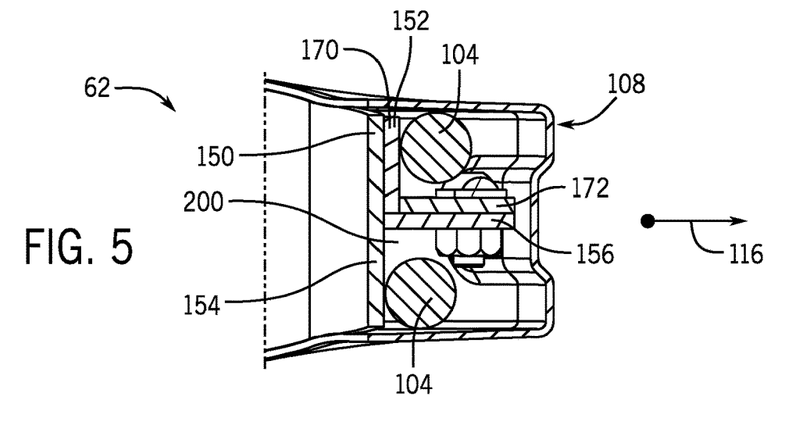
FIG. 5 is a top, cross-sectional view of the interface mount of FIG. 3, taken along line 5-5 of FIG. 2.

FIG. 5 is a top, cross-sectional view the interface mount 62 of FIG. 3, taken along line 5-5. As previously discussed, the lower body member 154 and the first mating flange 156 of the lower mounting arm 150 form a T-shaped cross section. The upper body member 170 and the second mating flange 172 of the upper mounting arm 152 form an L-shaped cross section. The top cover 106 couples to the upper body member 170 of the upper mounting arm 152 and has a generally U-shaped cross section. In addition, the bottom cover 108 couples to the lower body member 154 of the lower mounting arm 150 and has a generally U-shaped cross section. As shown, a portion of the top cover 106 fits within a portion of the bottom cover 108. The top cover 106 and the bottom cover 108 overlap with one another over a portion where the lower mounting arm 150 and the upper mounting arm 152 overlap with one another. The top cover 106 and the bottom cover 108 define a wire harness cavity 200 through which cables 104 for the interface are routed.

Figure 6:
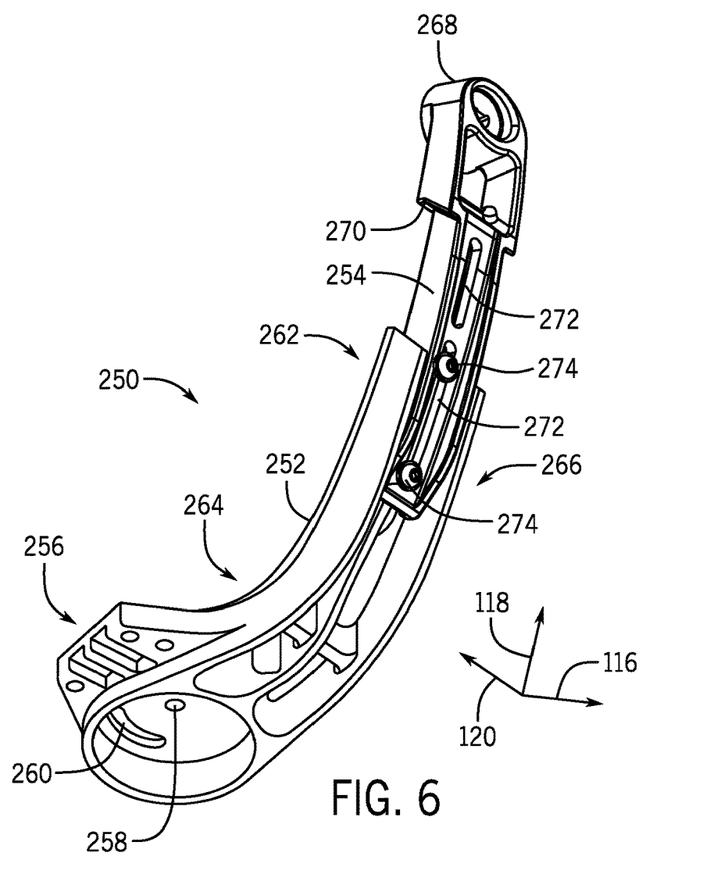
FIG. 6 is a back perspective view of another embodiment of an interface mount.

FIG. 6 is a perspective view an embodiment of an interface mount 250. As shown in the illustrated embodiment, both a lower mounting arm 252 and the upper mounting arm 254 have generally U-shaped cross sections, rather than the generally T-shaped and L-shaped cross-sections of the embodiment shown in FIGS. 3-5. As with the previously discussed embodiments, the lower mounting arm 252 includes a first mounting portion 256, which includes an aperture 258 and an arcuate slot 260, configured to mount to a base bracket of an armrest via a pivot pin and a limit pin. The lower mounting arm 252 also includes a first mating portion 262 opposite the first mounting portion 256. The lower mounting arm 252 has a bend 264. A portion of the lower mounting arm 252 has a generally U-shaped cross section that faces outward relative to the bend 264 (e.g., in first and second directions 116, 118). The upper mounting arm 254 includes a second mating portion 266 with a substantially similar contour to the first mating portion 262, such that the upper mounting arm 254 may slide relative to and remain in contact with the lower mounting arm 252. Opposite the second mating portion 266, the upper mounting arm 152 includes an interface mounting portion 268 configured to receive a ball mount of an interface, or a ball mount of a bracket supporting multiple interfaces. As previously discussed, other techniques for coupling one or more interfaces to the interface mount 250 may be utilized in other embodiments. The upper mounting arm 254 has a substantially U-shaped cross section, which faces inward (i.e., toward the lower mounting arm 252, such that when coupled to one another, the U-shaped cross sections of the lower mounting arm 252 and the upper mounting arm 254 face one another, defining a volume, which may be used to route interface cables.

As previously discussed, the upper mounting arm 254 slides relative to the lower mounting arm 252 from an expanded position to a contracted position, thereby varying the position of the interface within the cab of the vehicle. The upper mounting arm 254 also includes a shoulder 270 proximate the interface mounting portion 268 to block motion of the upper mounting arm 254 relative to the lower mounting arm 252 (e.g., contraction of the interface mount 250) beyond a point. The upper mounting arm 254 also includes slots 272. Fasteners 274 extend through at least one of the slots 272 and into the lower mounting arm 252. The length of the slots and the number of slots may vary from those shown. To adjust the position of the upper mounting arm 254 relative to the lower mounting arm 252, the operator may loosen the fasteners 274, adjust the upper mounting arm 254 to a desired position, and then tighten the fasteners 274 to lock the upper mounting arm 254 into place. As previously discussed relative to the other embodiment, the upper mounting arm 254 includes multiple slots 272. For example, if the slot or slots 272 receiving the fasteners do not enable the upper mounting arm 254 to reach a desired position, the user may remove the fasteners 274, slide the upper mounting arm 254 relative to the lower mounting arm 252, and extend the fasteners 274 to another slot 272.

Figure 7:
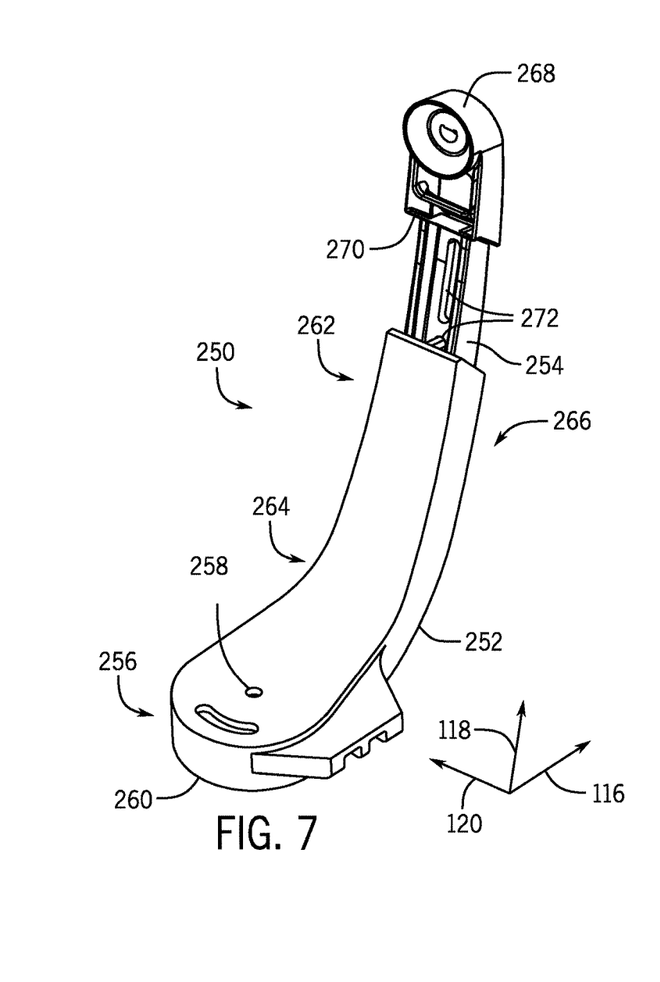
FIG. 7 is a front perspective view of the interface mount of FIG. 6.

FIG. 7 is a front perspective view of the interface mount 250 of FIG. 6. The lower mounting arm 252 has a substantially U-shaped cross section that faces outward (e.g., toward the upper mounting arm 254 in the first and second directions 116, 118), and extends around the upper mounting arm 254. The upper mounting arm 254 has a substantially U-shaped cross section that faces inward (e.g., toward the lower mounting arm 252 in the first and second directions 116, 118). The upper mounting arm 254 slides relative to the lower mounting arm 252, enabling the operator to adjust the position of the interface coupled to the interface mounting portion 268. Further, the aperture 258 and arcuate slot 260 of the lower mounting arm 252 enable the interface mount 250 to swing from side to side within a range of motion defined by the arcuate slot 260.

Figure 8:
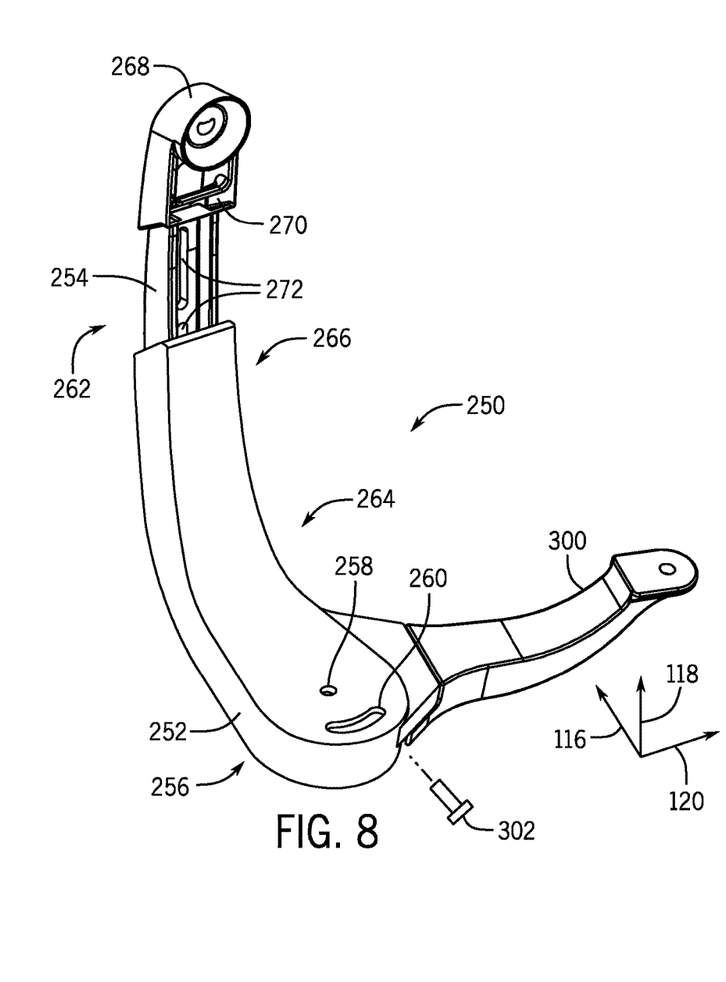
FIG. 8 is a perspective view of the interface mount of FIG. 6, in which the interface mount includes an auxiliary arm.

FIG. 8 is a perspective view of the interface mount 250 of FIG. 6, in which the interface mount includes an auxiliary arm 300. As illustrated, the auxiliary arm 300 couples to the first mounting portion 256 of the lower mounting arm 252 via one or more fasteners 302. The auxiliary arm 300 extends outward from the lower mounting arm 252 in the third direction 120. In some embodiments, the auxiliary arm may extend perpendicular to the lower mounting arm 252. In other embodiments, the auxiliary mounting arm 300 may extend from the lower mounting arm 252 at an oblique angle. The auxiliary mounting arm 300 may be configured to support an auxiliary interface. For example, in some embodiments, the auxiliary arm may be configured to support a second interface, which may be smaller than, larger than, or the same size as the interface supported by the interface mounting portion 268 of the interface mount 250. In other embodiments, the auxiliary arm may be configured to support a smart phone, a tablet, or a laptop computer.

Certain embodiments include an adjustable interface mount for use in a work vehicle that includes a lower arm that couples to a base bracket and an upper arm configured to slide relative to the lower arm, thereby providing a range of possible interface positions for an interface (e.g., a display). The interface mount couples to the base bracket via a pinned interface that enables the interface mount to pivot from side to side. Further, the interface mount couples to one or more interfaces via a ball mount that enables the operator adjust the roll, pitch, and yaw of the interface. Accordingly, the interface mount may position one or more interfaces to accommodate a wide range of operator heights.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:
1. An interface mount for a work vehicle, comprising:
a first mounting arm comprising:
a lower body member extending between a mounting portion disposed at a first end of the first mounting arm, and a first mating portion disposed at a second end of the first mounting arm, wherein the lower body member is configured to mount to a base bracket at the mounting portion, wherein the lower body member includes a bend disposed between the first end and the second end; and
a first mating flange extending substantially orthogonally outward from the lower body member, such that the lower body member and the first mating flange form a substantially T-shaped cross section that follows a curvature of the bend, wherein the first mating flange comprises a plurality of apertures disposed proximate the second end of the first mounting arm; and
a second mounting arm comprising:
an upper body member extending between a second mating portion disposed at a first end of the second mounting arm, and an interface mounting portion disposed at a second end of the second mounting arm, wherein the first mating portion of the lower body member and the second mating portion of the upper body member have matching contours; and a second mating flange extending substantially orthogonally outward from the upper body member, such that the upper body member and the second mating flange form a substantially L-shaped cross section, wherein the second mating flange comprises a plurality of elongated slots;

wherein the first mounting arm and the second mounting arm are configured to slide relative to one another between an expanded position and a contracted position, and wherein each of the plurality of apertures is configured to align with a respective elongated slot of the plurality of elongated slots and receive a fastener.

2. The interface mount of claim 1, wherein the plurality of slots are spaced apart along a first direction.

3. The interface mount of claim 1, wherein the mounting portion comprises an aperture and an arcuate slot, each configured to receive a respective pin.

4. The interface mount of claim 3, wherein the arcuate slot is sized to enable the first mounting arm to rotate up to approximately 60 degrees.

5. An interface mount for a work vehicle, comprising:
a first mounting arm comprising:
a lower body member extending between a first end of the first mounting arm and a second end of the first mounting arm, wherein the lower body member comprises an aperture and an arcuate slot, each configured to receive a respective pin, disposed proximate the first end of the first mounting arm, wherein the lower body member includes a bend disposed between the first end and the second end of the first mounting arm; and
a first mating flange extending substantially orthogonally outward from the lower body member, such that the lower body member and the first mating flange form a substantially T-shaped cross section that follows a curvature of the bend, wherein the first mating flange comprises a plurality of apertures disposed proximate the second end of the first mounting arm; and
a second mounting arm comprising:
an upper body member extending from a first end of the second mounting arm to a second end of the second mounting arm;
a second mating flange extending substantially orthogonally outward from the upper body member, such that the upper body member and the second mating flange form a substantially L-shaped cross section, wherein the second mating flange comprises a plurality of elongated slots, wherein the first mating flange and the second mating flange have matching contours; and
wherein the first mounting arm and the second mounting arm are configured to slide relative to one another between an expanded position and a contracted position, and wherein each of the plurality of apertures is configured to align with a respective elongated slot of the plurality of elongated slots and receive a fastener.

6. The interface mount of claim 5, comprising an upper cover configured to attach to the second mounting arm and a lower cover configured to attach to the first mounting arm.

7. The interface mount of claim 6, wherein the upper cover and the lower cover are configured to substantially enclose a wire harness cavity when coupled to the second mounting arm and the first mounting arm, respectively.

8. The interface mount of claim 6, wherein the upper cover and the lower cover have matching contours and are configured to slide relative to one another along a first direction between the expanded position and the contracted position.

9. The interface mount of claim 6, wherein the lower cover includes a wire harness exit proximate the first end of the first mounting arm when the lower cover is coupled to the lower mounting arm.

10. An interface mount for a work vehicle, comprising:
a first mounting arm comprising:
a lower body member extending between a first end of the first mounting arm, and a first mating portion disposed at a second end of the first mounting arm, wherein the lower body member includes a bend disposed between the first end and the second end; and
a first mating flange extending substantially orthogonally outward from the lower body member, such that the lower body member and the first mating flange form a substantially T-shaped cross section that follows a curvature of the bend, wherein the first mating flange comprises a plurality of apertures disposed proximate the second end of the first mounting arm;
a second mounting arm comprising:
an upper body member extending between a second mating portion disposed at a first end of the second mounting arm, and a second end of the second mounting arm, wherein the first mating portion of the lower body member and the second mating portion of the upper body member have matching contours; and
a second mating flange extending substantially orthogonally outward from the upper body member, such that the upper body member and the second mating flange form a substantially L-shaped cross section, wherein the second mating flange comprises a plurality of elongated slots;
wherein the first mounting arm and the second mounting arm are configured to slide relative to one another between an expanded position and a contracted position, and wherein each of the plurality of apertures is configured to align with a respective elongated slot of the plurality of elongated slots and receive a fastener.

* * * * *